United States Patent [19]

Marks

[11] 4,113,995
[45] Sep. 12, 1978

[54] TELEPHONE CRADLE ADAPTER

[76] Inventor: Thomas L. Marks, P.O. Box 746, Fordyce, Ark. 71742

[21] Appl. No.: 827,623

[22] Filed: Aug. 25, 1977

[51] Int. Cl.² ............................................. H04M 1/06
[52] U.S. Cl. ................................. 179/146 R; 179/178
[58] Field of Search ............................ 179/146 R, 178

[56] References Cited
U.S. PATENT DOCUMENTS 2,686,848   8/1954   Wicknick ..................... 179/146 R Primary Examiner—William C. Cooper
Attorney, Agent, or Firm—William R. Laney

[57] ABSTRACT

An adapter for attachment to a telephone cradle comprising an elastomeric sleeve defining a cavity for accepting the handpiece-retaining protuberance of a telephone receiver cradle, and a generally U-shaped metallic cap engaging the elastomer at opposite sides of the cavity enclosing the cavity. The metallic cap defines a slot at the lower edge thereof which communicates with the cavity.

4 Claims, 4 Drawing Figures

TELEPHONE CRADLE ADAPTER

BACKGROUND OF THE INVENTION

1. Field of the Invention

This invention relates to an adapter device suitable for quick detachable engagement with the prong or protuberance defining the handpiece-holding channel of a telephone cradle.

2. Brief Description of the Prior Art

It has heretofore been proposed to provide attachment devices or adapters which can be secured to the cradle brackets of telephones for the purpose of providing a rest or support for the telephone mouthpiece-earpiece combination at a time when one is not talking into the mouthpiece, but does not desire to hang up the telephone. The telephone is used in this fashion on some occasions when it is desired to record conversations by various types of microphonic pickup systems while leaving the hands free for writing or doing other work.

Adapters or auxiliary cradles of this type which have heretofore been provided are typified by those shown in U.S. Pat. No. 2,703,823 to Orms and U.S. Pat. No. 3,013,128 to Lockard. In general these devices provide an elastomeric or plastic device which defines a pocket or cavity which can be slipped over the prong or protuberance forming a portion of the telephone cradle for purposes of attachment of the device, with the remainder of the plastic or elastomeric structure forming a rest surface for supporting the handle of a telephone which interconnects the earpiece and the mouthpiece.

BRIEF DESCRIPTION OF THE PRESENT INVENTION

A need which is not answered and indeed is not contemplated by auxiliary cradle devices of the type described is the need for preventing the handpiece or handle of the telephone which interconnects the earpiece and mouthpiece from being misaligned in the cradle at the same time that the handpiece and its associated earpiece and mouthpiece are replaced in the cradle after a conversation, with such misalignment resulting in the phone not being "hung up," thereby making it impossible for another incoming call to be indicated by the ringing of the telephone. Misalignment of the handpiece of the phone with concomitant failure to close the necessary circuits to permit an incoming call to cause ringing of the phone is sometimes referred to as "leaving the phone off the hook."

The inadvertent malfunction or failure to properly complete a telephone call sometimes results from slamming down the handpiece upon the cradle so that it bounces upwardly to a canted attitude in which it fails to depress the contacts needed to completely reactivate the phone for incoming calls. Failure to properly hang up the phone also occasionally results merely from insufficient attention to the alignment of the handpiece in the cradle at the time that the handpiece is placed upon the cradle.

The present invention comprises a telephone cradle adapter which is utilized for extending the overall height of the cradle protuberances so as to give full assurance that when the handpiece is placed in the cradle, it will be properly aligned and received by the cradle, and the telephone will be reinstated to its "hung up" status. In general, four of such adapter devices are provided, and each includes an elastomeric sleeve which defines a cavity for accepting the handpiece-retaining protuberance forming a portion of the receiver cradle. A second major portion of the adapter is a generally U-shaped metallic cap which is bonded to, or engaged with, the elastomer at opposite sides of the cavity so as to close the cavity except for an opening thereinto formed by a slot which is defined by the metallic cap at the lower edge thereof. The described adapter can be quickly and easily placed upon the prongs of a telephone cradle so as to extend the height of these prongs without interfering with the fit of the handpiece of the phone within the cradle, or disturbing or reducing the amount of lateral slack or play which is characteristic of the fit between the handpiece and the cradle.

An important object of the invention is to provide a relatively inexpensively constructed, very easily used adapter device for placing upon the cradle protuberances or prongs of a telephone cradle to extend the overall height of these prongs and thereby provide better engagement for the telephone handpiece.

A further object of the invention is to provide an adapter device which does not in any way change the interaction and interfunction of a telephone handpiece and the cradle in which it rests when the phone is not in use, but which alleviates and prevents inadvertent failure to properly hang up the handpiece in the cradle due to misalignment.

Additional objects and advantages of the invention will become apparent as the following detailed description of a preferred embodiment of the invention is read in conjunction with the accompanying drawings which illustrate the invention.

GENERAL DESCRIPTION OF THE DRAWINGS

DETAILED DESCRIPTION OF A PREFERRED EMBODIMENT OF THE INVENTION

Figure 1:
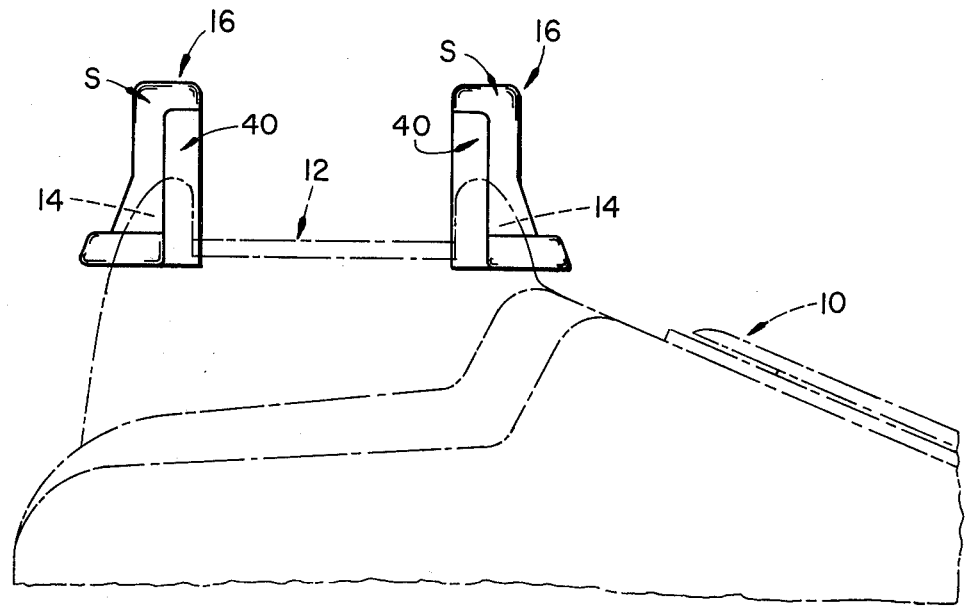
FIG. 1 is a side elevational view of a telephone having the adapter devices of the present invention in place upon the protuberances of the telephone receiver cradle.

Referring initially to FIG. 1 of the drawings, a desk model telephone is indicated generally by reference numeral 10. The telephone 10 is normally provided with a cradle 12 which is defined and bounded by four spaced, upwardly projecting lugs or protuberances 14. These protuberances 14 limit movement of the handpiece of the telephone after it has been replaced in the cradle, and assure that the handpiece rests upon movable mechanical contacts (not shown) which establish the circuitry of the telephone in a status receptive to incoming calls.

Two of the cradle adapters of the present invention are shown in FIG. 1, and are designated generally by reference numeral 16. An adapter is provided for each of the protuberances 14, and fits slidingly over the protuberance as shown in FIG. 1 to increase the total height of the protuberance, and also to provide a flat side facing the adjacent side of the handpiece when it is in its inoperative position. This arrangement assures that the handpiece will not be misplaced or mislaid in such a way that the phone is not properly inactivated and placed in a status receptive to incoming calls.

Figure 2:
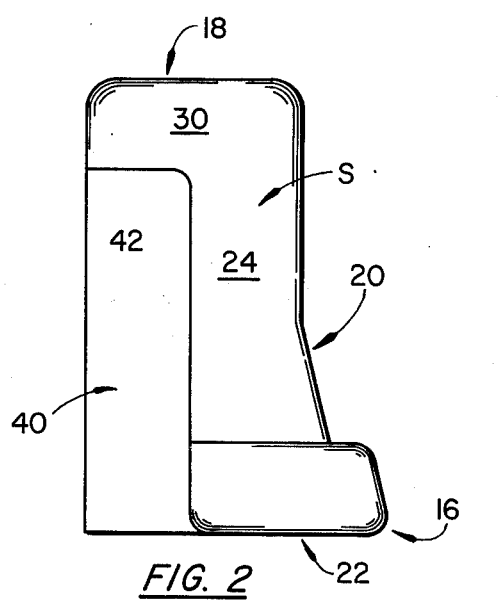
FIG. 2 is an enlarged side elevation of one of the adapters of the invention.
Figure 3:
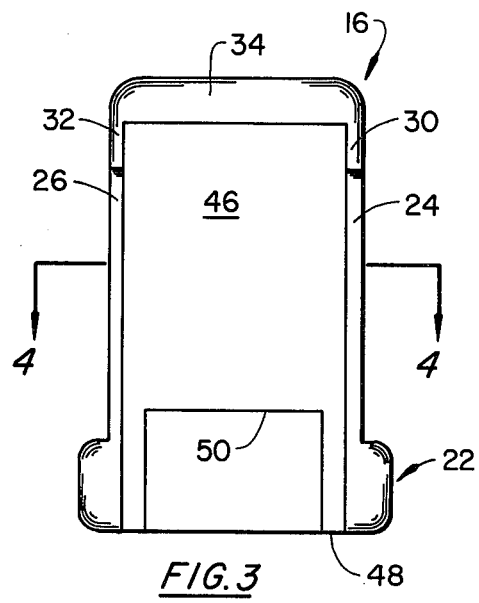
FIG. 3 is a view in elevation of the adapter shown in FIG. 2 as it appears when it has been rotated through 90° from the position shown in FIG. 2.
Figure 4:
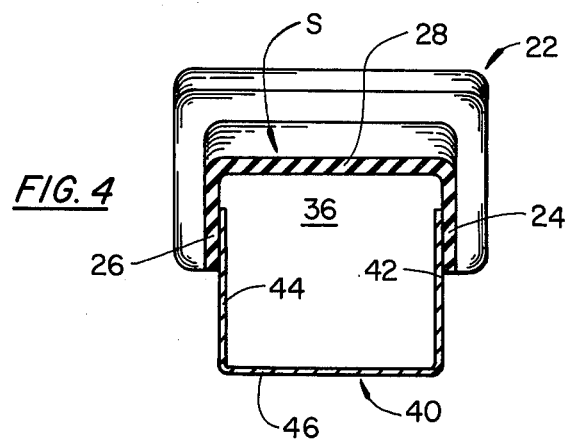
FIG. 4 is a sectional view taken along line 4—4 of FIG. 3.

The telephone cradle adapter 16 is shown in greater detail in FIGS. 2-4. The adapter 16 includes an elastomeric sleeve S which has a horizontally projecting upper or top portion 18, a vertically extending portion 20 and a base portion 22. The vertically extending portion 20 includes opposed, substantially parallel side walls 24 and 26 which are interconnected by a web portion 28. The top portion 18 includes side walls 30 and 32 connected to side walls 24 and 26, respectively, and a top wall 34. A cavity 36 is defined within the elastomeric sleeve S and is bounded by the opposed side walls 24 and 26 of the vertically extending portion 20 of the sleeve, by the top wall 34 at the upper side of the upper portion 18 and by the inner side wall portions of the hollow base portion 22. Rubber or other suitable elastomeric material may be used in the fabrication of the elastomeric sleeve. The thickness of the elastomeric material in the base portion 22 is preferably about 1/16 inch so that it can yield and accommodate easily with good frictional engagement, a protuberance 14 of the telephone cradle 12. The remaining portion of the rubber in the sleeve is ⅛ inch thick.

For the purpose of closing the cavity 36 which is defined by the elastomeric sleeve S, a generally U-shaped (in cross-section) metallic cap 40 is provided and has its opposed parallel legs 42 and 44 located at opposite sides of a web portion 46 spaced so as to mate with and extend along the inner side of the side walls 24 and 26 of the vertically extending portion 20 of the elastomeric sleeve. The legs 42 and 44 of the metallic cap 40 are extended slightly past the defining edges of the side walls 24 and 26 of the elastomeric sleeve, and also upwardly into the upper portion of the sleeve along the inner side of the side walls 30 and 32. The cap 40 is bonded by any suitable adhesive to the elastomeric sleeve and includes a lower edge 48 which terminates in coplanar alignment with the bottom side or surface of the base portion 22 of the elastomeric sleeve. The lower edge 48 of the metallic cap 40 is relieved at its lower side to provide a rectangular slot 50 at that location as shown in FIG. 3. The rectangular slot 50 is provided to accommodate the base or floor of the cradle 12 of the telephone 10 and allow the adapter to be snugged down over the protuberance 14 in the manner illustrated in FIG. 1.

When the adapters 16 are installed on the protuberances 14 in the manner described, the height of each protuberance is increased about ⅛ inch, and a steeper substantially monoplanar facing wall or surface is provided at each of the adapters to prevent the handpiece, when restored to the cradle, from riding up or bouncing up the inclines normally provided on the inner sides of the cradle protuberances. The described use of the adapters prevents inadvertent failure to properly restore the handpiece to its at rest position on the cradle so as to place the phone in the incoming call receiving status.

A preferred embodiment of the invention has been described herein by way of illustration. It will be understood, however, that various changes and innovations in the illustrated and described structure can be effected without departure from basic principles which underlie the invention. Changes and innovations of this type are therefore deemed to be circumscribed by the spirit and scope of the invention except as the same may be necessarily limited by the appended claims or reasonable equivalents thereof.

What is claimed is:

1. An adapter for attachment to the protuberance of a telephone cradle comprising:

an elastomeric sleeve defining a cavity for frictionally accepting the telephone cradle protuberance; and a metallic cap engaging the elastomeric sleeve at opposite sides of the cavity and closing one side of the cavity to form a vertically extending pocket open at the bottom for allowing the adapter to be pressed down over the telephone cradle protuberance.

2. An adapter as defined in claim 1 wherein said elastomeric sleeve includes:

a base portion;

a pair of opposed side wall portions having upper ends;

a web portion interconnecting the side wall portions; and a top portion extending between the upper ends of the side wall portions.

3. An adapter as defined in claim 1 wherein said metallic cap is U-shaped in cross-section and includes:

a pair of spaced, opposed vertically extending legs secured to said elastomeric sleeve; and a web portion interconnecting said legs and closing one side of said cavity, said metallic cap web portion having a slot in the lower side thereof.

4. An adapter as defined in claim 2 wherein said metallic cap is U-shaped in cross-section and includes:

a pair of spaced, opposed vertically extending legs each bonded along one edge portion thereof to the respective opposed side wall portions of said elastomeric sleeve; and a web portion interconnecting said legs, and spaced from the web portion of said elastomeric sleeve to close one side of said cavity, said web portion of said metallic cap having a slot in the lower side thereof opposite said base portion of said elastomeric sleeve.

* * * * *